(12) United States Patent
Nakamura et al.

(10) Patent No.: US 10,023,013 B2
(45) Date of Patent: Jul. 17, 2018

(54) TIRE AND TIRE SURFACE PRINTING METHOD

(71) Applicant: BRIDGESTONE CORPORATION, Tokyo (JP)

(72) Inventors: Yuki Nakamura, Tokyo (JP); Kojiro Torisu, Ohtawara (JP)

(73) Assignee: BRIDGESTONE CORPORATION, Tokyo (JP)

( * ) Notice: Subject to any disclaimer, the term of this patent is extended or adjusted under 35 U.S.C. 154(b) by 336 days.

(21) Appl. No.: 14/769,973

(22) PCT Filed: Feb. 17, 2014

(86) PCT No.: PCT/JP2014/000805
§ 371 (c)(1),
(2) Date: Aug. 24, 2015

(87) PCT Pub. No.: WO2014/147950
PCT Pub. Date: Sep. 25, 2014

(65) Prior Publication Data
US 2016/0001606 A1     Jan. 7, 2016

(30) Foreign Application Priority Data

Mar. 18, 2013 (JP) .................. 2013-055229

(51) Int. Cl.
*B60C 13/00*    (2006.01)
*B60C 13/02*    (2006.01)
(Continued)

(52) U.S. Cl.
CPC ............. *B60C 13/001* (2013.01); *B05D 5/06* (2013.01); *B29D 30/72* (2013.01); *B41M 1/40* (2013.01);
(Continued)

(58) Field of Classification Search
CPC ..... B60C 13/00; B60C 13/001; B60C 13/002; B60C 13/003; B60C 13/004; B60C 13/009; B60C 13/02; B60C 13/023; B60C 13/04
See application file for complete search history.

(56) References Cited

U.S. PATENT DOCUMENTS

| 1,448,286 | A | * | 3/1923 | Comstock | .............. | B29D 30/72 |
| | | | | | | 152/523 |
| 3,979,547 | A | * | 9/1976 | Roberts, Jr. | .............. | B05D 7/02 |
| | | | | | | 152/525 |
| 6,427,740 | B1 | | 8/2002 | Hiramatsu | | |

FOREIGN PATENT DOCUMENTS

| CN | 101332745 A | 12/2008 |
| CN | 102294943 A | 12/2011 |

(Continued)

OTHER PUBLICATIONS

Japanese Office Action for JP 2013-055229 dated Oct. 15, 2013.
International Search Report for PCT/JP2014/000805 dated Mar. 11, 2014.

*Primary Examiner* — Justin R Fischer
(74) *Attorney, Agent, or Firm* — Sughrue Mion, PLLC

(57) ABSTRACT

Provided is a tire and a tire surface printing method which are capable of reducing man-hours and cost required for application of printing on the tire surface. The tire and the tire surface printing method include, on an outer surface of at least one of side portions (3) thereof, a printed region (5) formed by printing. The printed region (5) includes: a dark-colored portion (7) having a black color, which is a base color of the tire; and a bright-colored portion (9) that has a color different from the black color and that is located to surround the dark-colored portion (7). The dark-colored portion (7) is not applied with any paint, and the bright-colored portion (9) includes a white-colored layer (11) that (Continued)

includes a white color paint and that is located as the lowermost layer being in contact at least with the outer surface (3a) of the side portion (3).

14 Claims, 2 Drawing Sheets

(51) Int. Cl.
  *B29D 30/72* (2006.01)
  *B05D 5/06* (2006.01)
  *B41M 1/40* (2006.01)
  *B41M 5/00* (2006.01)
  B60C 13/04 (2006.01)
  B41M 1/32 (2006.01)
(52) U.S. Cl.
  CPC ..... *B41M 5/0082* (2013.01); *B29D 2030/728* (2013.01); *B41M 1/32* (2013.01); *B41M 5/0041* (2013.01); *B41M 5/0064* (2013.01); *B60C 2013/045* (2013.01)

(56) References Cited

FOREIGN PATENT DOCUMENTS

| | | | |
|---|---|---|---|
| EP | 0604819 | A2 | 7/1994 |
| EP | 1493598 | A1 | 1/2005 |
| JP | 4-121205 | * | 4/1992 |
| JP | 4-121205 | A | 4/1992 |
| JP | 2006-82776 | A | 3/2006 |
| JP | 2007-210378 | A | 8/2007 |
| JP | 2012-61922 | A | 3/2012 |

* cited by examiner

TIRE AND TIRE SURFACE PRINTING METHOD

CROSS REFERENCE TO RELATED APPLICATIONS

This application is a National Stage of International Application No. PCT/JP2014/000805filed Feb. 17, 2014, claiming priority based on Japanese Patent Application No. 2013-055229 filed Mar. 18, 2013, the contents of all of which are incorporated herein by reference in their entirety.

TECHNICAL FIELD

The present disclosure relates to a tire and a tire surface printing method.

BACKGROUND

Conventionally, display of corporate names, brand names, or the like in the forms of letters, graphics, symbols such as barcodes, patterns, or the like is added onto outer surfaces in side portions including sidewall portions and bead portions. (Refer to Patent Literature 1, for example.) Such display sometimes employ printing in which paints in white, cyan, magenta, yellow, black, and other colors are used for display with full-color printing.

CITATION LIST

Patent Literature

PL1: JP2012061922A

SUMMARY

Technical Problem

Decorative coating to the outer surfaces in the side portions of a tire by printing as described above normally involves use of a plurality of paints superposed on top of one another, and therefore, requires many man-hours at a higher cost in accordance with amounts of the paints used. This has produced a need for reducing the man-hours and cost required for the printing.

Accordingly, the present disclosure is to provide a tire and a tire surface printing method both of which are capable of reducing the man-hours and cost required for the application of printing on the tire surface.

Solution to Problem

According to one aspect thereof for solving the above problem, the present disclosure is directed to a tire including, on an outer surface of at least one of side portions thereof, a printed region formed by printing. The printed region includes: a dark-colored portion having a black color, which is a base color of the tire; and a bright-colored portion that has a color different from the black color and that is located to surround the dark-colored portion. The dark-colored portion is not applied with any paint, and the bright-colored portion includes a white-colored layer that includes a white color paint and that is located as a lowermost layer being in contact at least with the outer surface of the at least one of side portions. Herein, the "base color of the tire" refers to the color of rubber used in the side portion of the tire, and the phrase "to surround the dark-colored portion" encompasses cases where the dark-colored portion is not completely surrounded by the bright-colored portion.

Advantageous Effect

The tire and the tire surface printing method according to the present disclosure make it possible to reduce man-hours and cost required for the application of printing on the tire surface.

DETAILED DESCRIPTION

One exemplary embodiment according to the present disclosure will be described below in detail with reference to the drawings.

The present disclosure is applicable to an ordinary pneumatic tire, and although not illustrated, a pneumatic tire in the present embodiment conventionally includes a pair of bead portions, a pair of sidewall portions extending outward of the bead portions in the tire radial direction, and a tread portion extending across the sidewall portions. The pneumatic tire in the present embodiment also includes, inside thereof, a carcass layer that extends toroidally via the bead portions, the sidewall portions, and the tread portions and that has end portions turned up around the bead cores embedded in the bead portions, and a belt layer located outward of the carcass layer in the tire radial direction. However, the present disclosure is not limited to the aforementioned embodiment of the pneumatic tire and, of course, is also applicable to a solid tire (not illustrated) having a solid structure. Herein, supposing that a pneumatic tire is adopted as the tire, various dimensions such as the length and the area of the printed region are measured along the surface of the tire in the state (hereinafter, called a "predetermined state) where the pneumatic tire is assembled with a normal rim and inflated with a normal internal pressure, with no load exerted thereon. The "normal rim" refers to the "standard rim" specified by the JATMA, the "design rim" specified by the TRA, and the "measuring rim" specified by the ETRTO. The "normal internal pressure" refers to the "maximum air pressure" specified by the JATMA, the maximum value of "tire load limits at various cold inflation pressures" specified by the IRA, or "inflation pressures" specified by the ETRTO. The "brightness" is defined according to the HSV model, and the brightness is calculated by first measuring a brightness, a saturation, and a hue in a color system (e.g., Lab color space) other than the HSV color system by using a spectrophotometer (which is manufactured by, for example, Konika Minolta, Inc), and subsequently converting the brightness, the saturation, and the hue thus measured into those of the HSV color system by using a necessary software (such as)Photoshop®.

Figure 1:
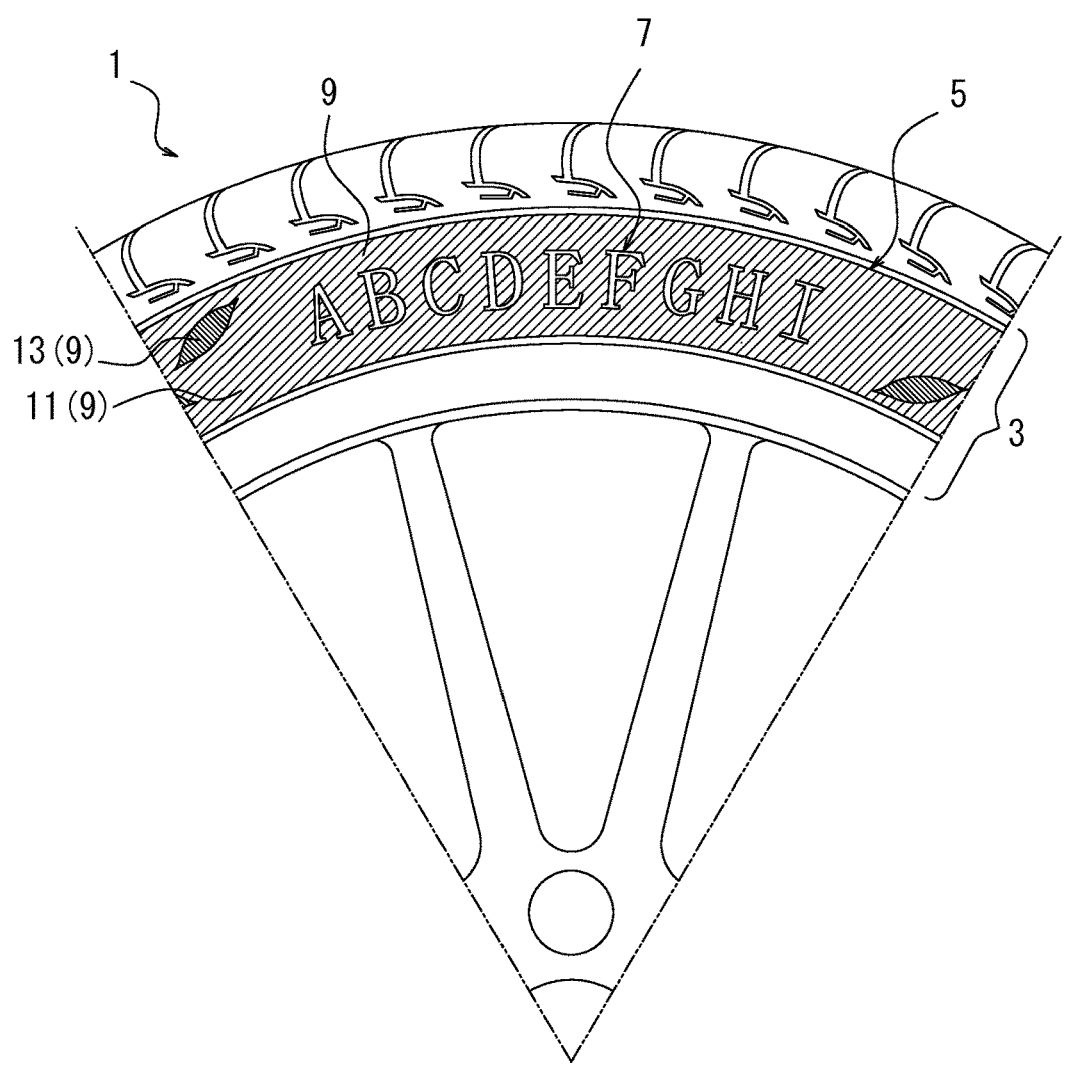
FIG. 1 is partial side view of a side portion of a tire according to one embodiment of the present disclosure.

FIG. 1 is a partial side view of an exemplary tire according to the present embodiment. A tire 1 includes, on an outer surface in a side portion 3 including at least one (one in the present example) bead portion and sidewall portion, a printed region 5 formed by printing. The printed region 5 may be formed annually over the entire outer surface of the side portion 3 or formed only on part of the side portion 3.

The printed region 5 includes: a dark-colored portion 7 that has a black color, which is a base color of the tire, and that is not applied with any paint; and a bright-colored portion 9 (which is indicated by a shaded portion in FIG. 1) having a color different from the base color of the tire. The dark-colored portion 7 is surrounded by the bright-colored portion 9. That is to say, the printed region 5 is basically defined by the contour of the bright-colored portion 9, and the printed region 5 may also be partially defined by the contour of the dark-colored portion 7 when the bright-colored portion 9 does not completely surround the dark-colored portion 7. In the present example, the printed region 5 is defined by the contour of the bright-colored portion 9. As illustrated in the figure, the dark-colored portion 7 forms a display portion that displays a mark indicated by the letters "ABCDEFGHI." This display portion may display, for example, a corporate name, a brand name, a tire size, a production date, or the like in the forms of a letter, a graphic, a symbol such as a barcode, a pattern, or the like. Forming the display portion by the dark-color portion 7 dramatically improves visibility of the display portion and also improves accuracy of printing quality since it is ensured that the dark-colored portion 7 having only a single color per surface is smoothly visible. Meanwhile, forming the display portion by coloring the dark-colored portion can deteriorate accuracy of printing quality since part of the dark-colored portion might be colored differently than it is supposed to look due to ink dripping, dot missing, or the like.

Figure 2A:
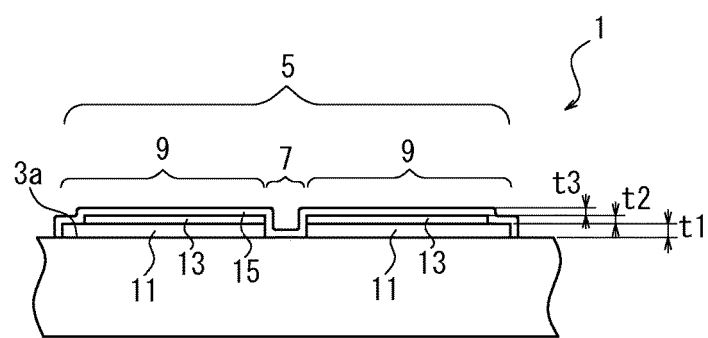
FIG. 2A is a schematic sectional view of a printed region of a tire according to one embodiment of the present disclosure.

FIG. 2A is a schematic sectional view in the tire width direction of the printed region 5 in the side portion 3 of the tire 1. The bright-colored portion 9 includes a white-colored layer 11 formed by a white color paint as the lowermost layer being in contact with an outer surface 3a in the side portion 3 of the tire. The bright-colored portion 9 may also include a colored layer 13 as an outer layer of the white-colored layer 11 as needed. To sufficiently cover up the black color (having a brightness of, for example, 0), which is the base color of the tire, the white-colored layer 11 is formed by the white-colored paint having a brightness of preferably 90% or more, more preferably 95% or more, and the white-colored layer 11 also has a thickness t1 preferably in the range from 0.01 to 0.3 mm. The colored layer 13 may be formed by paints having cyan, magenta, yellow, and other colors. The colored layer 13 has a thickness t2 that is preferably less than the thickness t1 of the white-colored layer 11, and the thickness t2 may be 0.15 mm or less. By covering up the base color of the tire with the white-colored layer 11, influence of the base color of rubber on the colored layer 13 is reduced, and coloring is improved. Furthermore, by setting the thickness t1 of the white-colored layer 11 to be greater than the thickness t2 of the colored layer 13, strain is absorbed by the white-colored layer, and occurrence of cracks between the white-colored layer 11 and the colored layer 13 is prevented. As a result, durability is improved. Moreover, the brightness of the white color paint forming the white-colored layer 11 of 90% or more further ensures that the base color of the tire in the bright-colored portion 9 is covered. As a result, influence of the base color of the tire on the white-colored layer 11 or the colored layer 13 is reduced, thereby making the printed region 5 stand out more prominently.

There may also be disposed a protective layer 15 covering both the bright-colored portion 7 and the dark-colored portion 9, for the purposes of protecting the surfaces of the dark-colored portion 7 and the bright-colored portion 9 and preventing the paints from peeling from a boundary between the dark-colored portion 7 and the bright-colored portion 9. The protective layer 15 may be transparent or semitransparent and is made of, for example, a water-based resin, a urethane -based resin, or the like. The protective layer 15 has a thickness t3 that is preferably less than a sum of the thickness t1 of the white-colored layer 11 and the thickness t2 of the colored layer 13, and the thickness t3 is preferably, for example, 0.2 mm or less. The above structures prevent cracks from occurring between the protective layer 15 and the white-colored layer 11 or between the protective layer 15 and the colored layer 13 due to differences in deformation between the protective layer 15 and the white-colored layer 11 or between the protective layer 15 and the colored layer 13 when the tire undergoes deformation. Furthermore, to prevent occurrence of cracks, a thickness of the printed region 5 measured between the outer surface of the side portion and the outer surface of the protective layer is preferably 0.5 mm or less.

Printing described above is conducted by, for example, screen printing, paint jet printing, relief printing, and other printing methods, and painting includes firstly applying the white color paint onto part of the outer surface in the side portion 3 of the tire, excluding the dark-colored portion 7, that is to form the bright-colored portion 9, thus forming the white-colored layer 11. Painting includes, after applying the white color paint, lack color and the white color on top of the white-colored layer 11 in part of the bright-colored portion 9 that is to be applied with a color different from the white color, thus forming the colored layer 13. Thus producing any colors other than the black color, which is the base color of the tire, by paints conventionally allows full-color printing taking advantage of the base color of the tire. Painting may also include, after superposing the paint having a color different from the black color and the white color, forming the aforementioned protective layer 15 covering both the dark-colored portion 7 and the bright-colored portion 9, as needed. Methods for forming the protective layer 15 include, for example, coating using a dispenser or a brush.

Figure 2B:
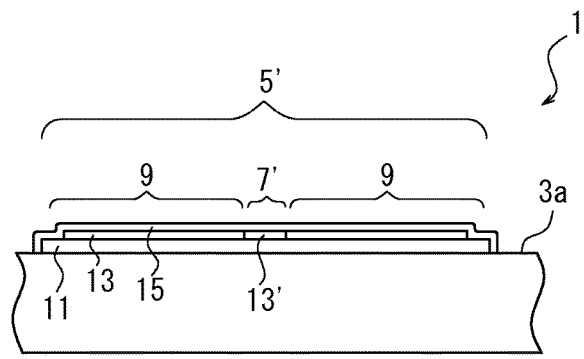
FIG. 2B is a schematic sectional view of a printed region of a comparative tire.

FIG. 2B is a schematic sectional view of a printed region formed on a tire surface by a conventional printing method. Conventional full-color printing onto tire surfaces generally uses five different paints in colors of cyan, magenta, yellow, white, and black, and procedures of such printing include firstly applying a white color paint onto the entire printed region 5', thus forming the white-colored layer 11, and subsequently applying paints in different colors as outer layers of the white-colored layer 11 superposed on top of one another, thus forming the colored layer 13. In this case, a black color paint is applied onto the dark-colored portion 7' which is to be colored black, as the outer layer superposed on the white-colored layer 11, thus forming a colored layer 13'.

In contrast, the present embodiment does not need to apply any paint in a desired dark-colored portion. This eliminates the needs for the undercoated white color paint and the black color paint, thereby reducing cost and man-hours. Furthermore, decorative painting with a natural feel making use of the base color of the tire, although difficult to achieve solely with paints, is achieved. Moreover, since the tire according to the present embodiment includes the dark-colored portion 7, which has the base color of the tire, surrounded by the bright-colored portion 9, which has a color different from the base color, the contour of the dark-colored portion 7 stands out prominently. This is effective when the dark-colored portion 7 represents a mark or the like.

In the tire according to the present embodiment, the bright-colored 9 has an area that is preferably greater than an area of the dark-colored portion 7. This allows the color different from the base color of the tire to occupy a large area, thereby further emphasizing the printed area 5.

Furthermore, in the tire according to the present embodiment, the boundary line formed between the bright-colored portion 9 and the dark-colored portion 7 has a first portion that is inclined with respect to the tire circumferential direction and a second portion that extends along the tire circumferential direction, and the first portion preferably has a total length that is greater than a total length of the second portion. Since a portion of the boundary line that extends along the tire circumferential direction tends to peel off in response to deformation of the tire, reducing the second portion of the boundary line extending along the tire circumferential direction reduces occurrence of peeling starting from the boundary between the bright-colored portion 9 and the dark-colored portion 7.

EXAMPLES

Example tire including the printed region formed on the outer surface in the side portion by printing as illustrated in FIG. 1 according to the present embodiment, and Comparative Example tire were manufactured experimentally for assessment described below. Comparative tire has the same structure as Example tire except for the dark-colored portion in the printed region that includes the colored layer formed by applying the black color paint as an outer layer of the white-colored layer.

As illustrated in FIG. 2A, the dark-colored portion included in the printed region of Example tire is not applied with any paint, and accordingly, the black color of the base material of the tire is visible externally. As illustrated in FIG. 2B, the dark-colored portion of Comparative Example tire includes the white-colored layer including the white color paint, and the colored layer located as the outer layer of the white-colored layer and including the black color paint.

In comparison with these tires, Example tire provided a superior impression than Comparative Example tire without compromising the natural feel of the tire. Furthermore, man-hours and cost required for the printing of the printed region were reduced by approximately 30% in Example tire than Comparative Example tire.

INDUSTRIAL APPLICABILITY

Thus, the tire and the tire surface printing method according to the present disclosure allow reduction in man-hours and cost required for the application of printing on the tire surface.

REFERENCE SIGNS LIST 1 tire
3 side portion
5 printed region
7 dark-colored portion
9 bright-colored portion
11 white-colored layer
13 colored layer
15 protective layer

The invention claimed is:

1. A tire comprising, on an outer surface of at least one of side portions thereof, a printed region formed by printing, wherein the printed region includes:
a dark-colored portion having a black color, which is a base color of the tire; and a bright- colored portion that has a color different from the black color and that is located to surround the dark-colored portion, and
wherein
the dark-colored portion is not applied with any paint, and
the bright-colored portion includes a white-colored layer that comprises a white color paint and that is located as a lowermost layer being in contact at least with the outer surface of the at least one of side portions,
wherein the bright-colored portion further includes a colored layer that comprises a paint having a color different from the black color and the white color, that is located as an outer layer of the white-colored layer, and that has a thickness less than a thickness of the white-colored layer,
wherein a boundary line between the bright-colored portion and the dark-colored portion has a first portion that is inclined with respect to a tire circumferential direction and a second portion that extends along the tire circumferential direction, and the first portion has a total length that is greater than a total length of the second portion,
the white-colored layer also has a thickness in the range from 0.01 to 0.3 mm, and
the colored layer has a thickness is 0.15 mm or less.

2. The tire of claim 1, wherein the printed region further includes a protective layer covering both the bright-colored portion and the dark-colored portion.

3. The tire of claim 2, wherein the protective layer has a thickness that is less than a sum of thicknesses of the white-colored layer and the colored layer included in the bright-colored portion.

4. The tire of claim 1, wherein at least part of the dark-colored portion forms a display portion having at least one of a letter, a graphic, a symbol, and a pattern.

5. The tire of claim 1, wherein the bright-colored portion occupies a larger area than the dark-colored portion in the printed region.

6. The tire of claim 1, wherein the white color paint constituting the white-colored layer has a brightness of 90% or more.

7. The tire of claim 1, wherein a height of the dark-colored portion is less than that of the white-colored layer in a tire width direction.

8. A tire surface printing method for forming a printed region on an outer surface of at least one of side portions of a tire, wherein the printed region includes: a dark-colored portion having a black color, which is a base color of the tire; and a bright-colored portion that has a color different from the base color and that is located to surround the dark-colored portion, the tire surface printing method comprising:
forming, in the bright-colored portion, a white-colored layer as a lowermost layer being in contact at least with the outer surface of the at least one of side portions, by applying a white color paint and without applying any paint to the dark-colored portion,
forming, in the bright-colored portion, a colored layer as an outer layer of the white-colored layer by applying a paint having a color different from the black color and the white color, the bright-colored layer having a thickness less than a thickness of the white-colored layer,
wherein a boundary line between the bright-colored portion and the dark-colored portion has a first portion that is inclined with respect to a tire circumferential direction and a second portion that extends along the tire circumferential direction, and the first portion has a total length that is greater than a total length of the second portion, the white-colored layer also has a thickness in the range from 0.01 to 0.3 mm, and the colored layer has a thickness is 0.15 mm or less.

9. The tire surface printing method of claim 8, further comprising:

forming a protective layer as an outermost layer in the printed region, to cover both the dark-colored portion and the bright-colored portion.

10. The tire surface printing method of claim 9, wherein the protective layer has a thickness that is less than a sum of thicknesses of the white-colored layer and the colored layer included in the bright-colored portion.

11. The tire surface printing method of claim 8, wherein at least part of the dark-colored portion forms a display portion having at least one of a letter, a graphic, a symbol, and a pattern.

12. The tire surface printing method of claim 8, wherein the bright-colored portion occupies a larger area than the dark-colored portion in the printed region.

13. The tire surface printing method of claim 8, wherein the white color paint constituting the white-colored layer has a brightness of 90% or more.

14. The tire surface printing method of claim 8, wherein a height of the dark-colored portion is less than that of the white-colored layer in a tire width direction.

\* \* \* \* \*